H. C. LYLE.
TOOL JOINT.
APPLICATION FILED MAY 11, 1920.
1,349,518. Patented Aug. 10, 1920.
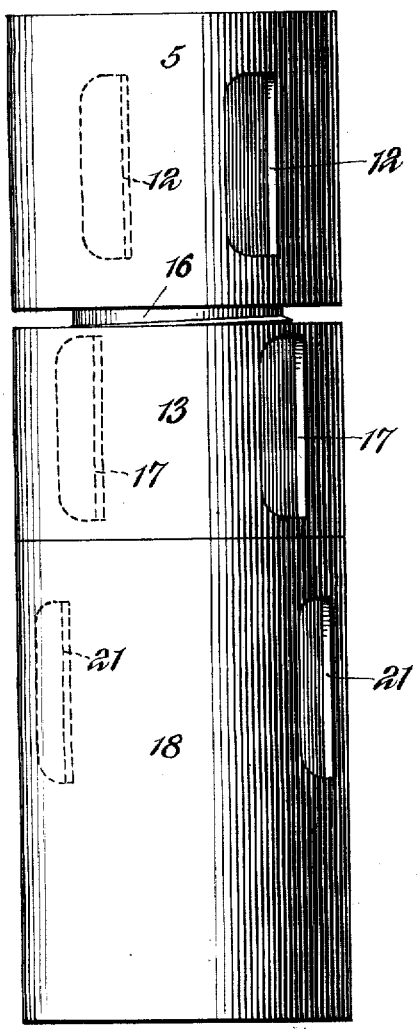
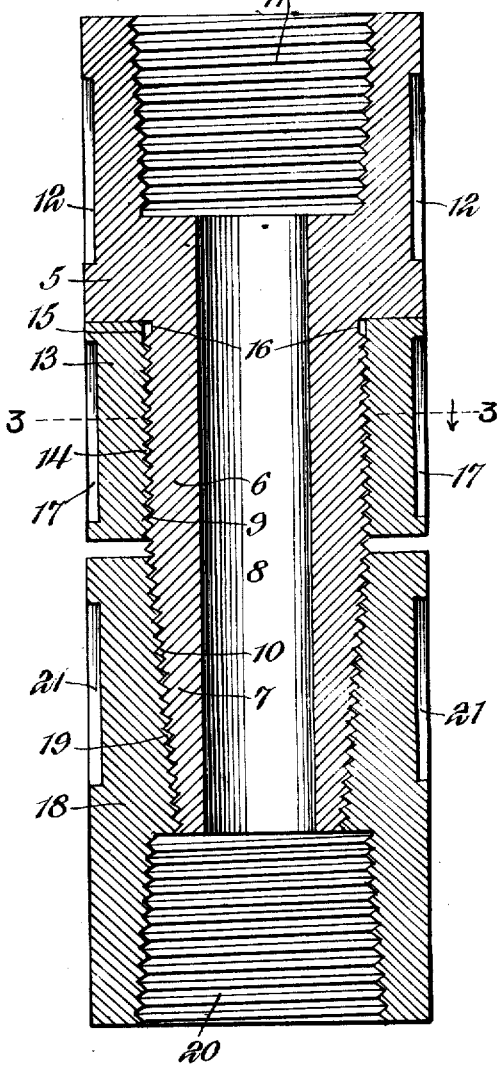
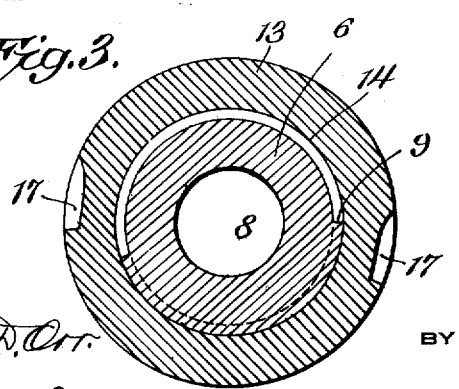
H. C. Lyle, INVENTOR,

UNITED STATES PATENT OFFICE.

HENRY CLAUDE LYLE, OF BEAUMONT, TEXAS.

TOOL-JOINT.

1,349,518.

Specification of Letters Patent. Patented Aug. 10, 1920.

Application filed May 11, 1920. Serial No. 380,697.

*To all whom it may concern:*

Be it known that I, HENRY C. LYLE, a citizen of the United States, residing at Beaumont, in the county of Jefferson and State of Texas, have invented a new and useful Tool-Joint, of which the following is a specification.

This invention relates to improvements in tool joints for drill pipes on rotary drilling rigs.

The object of the invention is to provide a simple, strong and easily manipulated locking joint for tools of this character.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawing:—

Figure 1 is an elevation of an embodiment of the invention showing the three parts in assembled relation.

Fig. 2 is a longitudinal cross-section of the same showing the locking collar or nut in an alternate position.

Fig. 3 is a transverse cross-section on the line 3—3 of Fig. 2.

The tool joint proper comprises three principal parts, namely, a pin, a box and a locking collar or nut. The box and locking collar are held upon the pin with the collar locking the box in position.

The pin comprises a cylindrical portion 5 and a reduced screw-threaded extension 6. The screw-threaded extension 6 is cylindrical for a portion of its length and is tapered as at 7 for the remainder of its length. Screw threads 9 are provided on the cylindrical section of the screw-threaded extension and screw threads 10 on the tapered section of the same, the threads 9 and 10 merging into each other or running continuously the length of the pin extension. The pin has a longitudinal bore 8 running the length thereof and a tapered screw-threaded bore 11 opening into the plain or unthreaded bore 8. The screw-threaded bore 11 is for the purpose of coupling a pipe to that end of the joint. The threads 9 stop short of the cylindrical portion 5 of the pin, leaving a smooth or unthreaded surface 16.

The locking collar 13 has an internal screw-threaded bore 14 of sufficient size to be received upon the cylindrical section of the pin extension. This locking collar or nut 13 has its threads stopping short of one end thereof as indicated at 15, the smooth inner portion of the bore of the locking collar fitting over the corresponding part 16 of the pin. The length of the locking nut 13 is somewhat shorter than the threaded cylindrical section.

The box 18 is provided at one end with a tapered screw-threaded bore 20 so as to provide a coupling for a pipe, the bores 20 and 11 being substantially similar. The box 18 has another tapered screw-threaded bore 19 of the same length as the tapered section 7 of the pin extension; thus the box may be screwed upon the tapered end of the pin extension until the box encounters the cylindrical section of the pin extension, whereupon the box will be screwed thereon to its fullest extent. The bore 20 will then be open to the bore 8 and the latter to the bore 11, as Fig. 2 discloses. Each of the three elements comprising the tool joint has a plurality of peripherally arranged grooves 12, 17 and 21, respectively, which grooves are provided so that a wrench or other tool may grip any one of the three parts readily to turn it relatively to the other two parts.

The reason why the locking nut 13 has a length somewhat less than the cylindrical section of the pin extension is to permit limited adjustment or movement of the locking nut upon said section. When the box is screwed home upon the pin, the locking nut may be positioned either as disclosed in Fig. 1 or as shown in Fig. 2. The position of Fig. 1 is the position in which the collar 13 exerts a locking effect upon the box to hold the same securely upon the pin. The position of Fig. 2 is the position which the locking collar will have immediately after the box has been screwed upon the pin but before the box has been locked.

In order to assemble the different parts, the locking collar is first screwed upon the pin extension until it is in abutment with the cylindrical portion 5 of the pin as shown in Fig. 2. Then the box is screwed upon the tapered section of the pin into the position shown in Fig. 2. The locking collar is then rotated from right to left so as to abut against the inner end of the box, as shown in Fig. 1. The parts will now be mutually interlocked and under no conditions of service will they become detached from each other. The device of the present invention has been employed on a tool which has been rotated both forwardly and backwardly without affecting the hold of the three interlocking parts on each other.

It is a drawback to many tool joints of this character that they are made of such hard metal that a pipe wrench cannot grip them sufficiently to permit detaching thereof except at an expenditure of a great amount of time and trouble. By the provision of the grooves in the three parts of the present joint, I am enabled to obtain a firm grip upon each of said parts so that they may be loosened from each other however long they have been in use.

The present invention, while described as a tool joint, is believed to be somewhat broader than merely a tool joint and is thought to be susceptible of use as a pipe coupling. Accordingly, I do not wish to be limited to its use as a tool joint, but desire to employ the device of the invention for any and all coupling purposes for which it may be found useful.

What is claimed is:

1. In combination, a pin, a box, and a locking collar or nut, the pin having a longitudinal bore, the box and the pin both having pipe coupling connections, the box and the collar both being screw-threadably mounted on said pin with the collar locking the box.

2. In combination, a pin, a box, and a locking collar or nut, the box and the pin both having pipe coupling connections, the box and the collar both being screw-threadably mounted on said pin with the collar locking the box, all three elements having spaced peripheral grooves whereby a tool may grip any one and turn it relatively to the others.

3. In combination, a pin having a pipe coupling connection at one end, a screw-threaded extension at the other end, a box having a pipe coupling connection at one end and an internally screw-threaded section extending inwardly at the other end to engage with the screw threaded extension of the pin, and means also mounted on the screw-threaded extension for locking the box upon the pin.

4. In combination, a pin having a pipe coupling connection at one end, a screw-threaded extension at the other end and a longitudinal bore, said screw-threaded extension including a cylindrical section and a tapering section, a box having a pipe coupling connection at one end and a screw-threaded bore extending inwardly from the other end to engage with the tapering section of the pin, and means also mounted on the cylindrical section for locking the box upon the pin.

5. In combination, a pin having a pipe coupling connection at one end, a screw-threaded extension at the other end and a longitudinal bore, said screw-threaded extension including a cylindrical section and a tapering section, a box having a pipe coupling connection at one end and a screw-threaded bore extending inwardly from the other end to engage with the tapering section of the pin, and a locking collar or nut of less length than the length of the cylindrical section and mounted on said section for locking the box upon the pin.

6. In combination, a pin having a cylindrical portion, a reduced screw-threaded portion and a bore running longitudinally of the pin, the reduced screw-threaded portion including a cylindrical section joined to the cylindrical portion and a tapered section, the threads of the two sections being continuous, a box mounted upon the tapered section, and a locking collar or nut mounted upon the cylindrical section.

7. In combination, a pin having a cylindrical portion, a reduced screw-threaded portion and a bore running longitudinally of the pin, the reduced screw-threaded portion including a cylindrical section joined to the cylindrical portion and a tapered section, the threads of the two sections being continuous, a box mounted upon the tapered section, and a locking collar or nut mounted upon the cylindrical section and having a limited movement on the pin after the box is screwed home.

8. In combination, a pin having a cylindrical portion, a reduced screw-threaded portion and a bore running longitudinally of the pin, the reduced screw-threaded portion including a cylindrical section joined to the cylindrical portion and a tapered section, the threads of the two sections being continuous, a box mounted upon the tapered section, and a locking collar or nut mounted upon the cylindrical section, the box and pin each having a tapered internally screw-threaded bore opening into the bore of the pin when the parts are assembled.

9. In combination, a pin having a cylindrical portion, and a reduced screw-threaded portion, the reduced screw-threaded portion including a cylindrical section joined to the cylindrical portion and a tapered section, the threads of the two sections being continuous, a box mounted upon the tapered section, and a locking collar or nut mounted upon the cylindrical section and having a limited movement on the pin after the box is screwed home.

In testimony, that I claim the foregoing as my own, I have hereto affixed my signature.

HENRY CLAUDE LYLE.